Patented Sept. 19, 1939

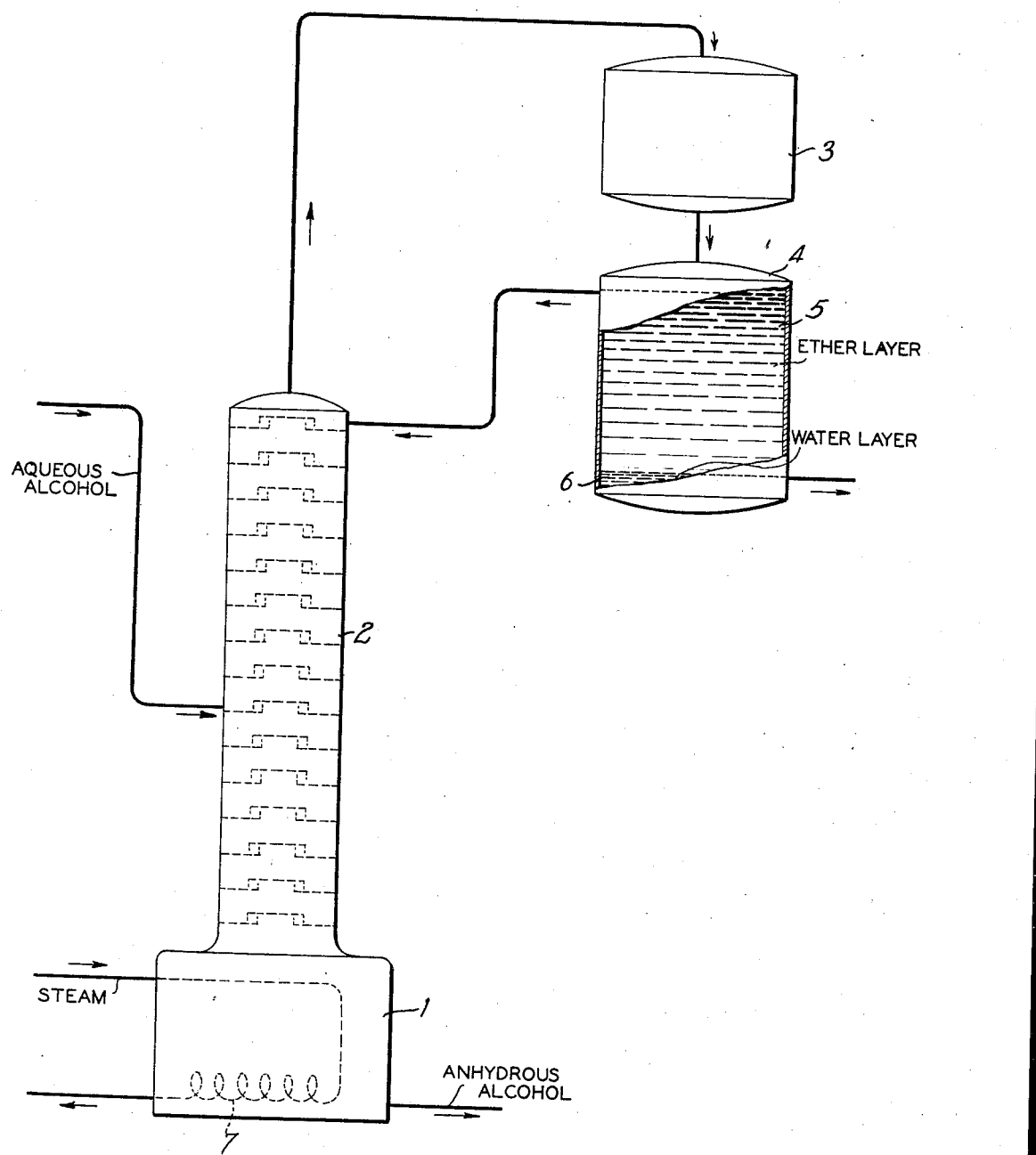

2,173,692

UNITED STATES PATENT OFFICE 2,173,692

DEHYDRATION OF ETHANOL

Alan Marples, South Charleston, W. Va., assignor to Carbide and Carbon Chemicals Corporation, a corporation of New York Application October 31, 1936, Serial No. 108,642

17 Claims. (Cl. 202—42)

This invention relates to an improved and economical process for dehydrating ethanol. More particularly, it pertains to the use of diisopropyl ether as the dehydrating agent in distillation systems adapted to the production of anhydrous ethanol. The preferred mode of operation is to conduct the process under conditions such as to remove water in admixture mainly with diisopropyl ether, leaving substantially anhydrous alcohol as a still residue.

It is well known that simple distillation of aqueous ethanol does not result in the recovery of anhydrous alcohol, owing to the formation of a constant boiling binary mixture of ethanol and water. Among the many processes which have been proposed for making anhydrous ethanol, one of the best known is that involving the use of benzene which is added to the aqueous alcohol and with which the water is distilled off in a ternary constant boiling mixture consisting of benzene, alcohol and water. This distillate separates into two layers upon condensation.

The benzene process, however, as well as other processes now in use, requires very closely controlled rectification to separate properly the azeotrope containing the water, from the alcohol. Another disadvantage attendant on the use of benzene is the fact that unduly large amounts of alcohol are distilled over with the ternary mixture. In addition, the separation of the ternary azeotropic distillate into layers for recovering the dehydrating agent (benzene) is not as rapid as is necessary for most efficient operation, and the concentration of alcohol in the lower, or aqueous layer, is so high that this layer should be further distilled to prevent waste of considerable alcohol. A small excess of alcohol in the distillate beyond that necessary to form the ternary benzene azeotrope increases the difficulty of separating the distillate into layers in a decanter, and a considerable reflux must be returned to the top of the column without passing through the decanter in order to insure the formation of the ternary azeotrope. These disadvantages necessitate considerable refractionation and the use of special equipment.

It has been found that the disadvantages inherent in ethanol dehydration processes by distillation may be mitigated by a distillation process employing diisopropyl ether as the dehydrating agent. For example, a higher percentage of water removal along with less alcohol in the distillate, characterizes the use of diisopropyl ether as the dehydrating agent. This low alcohol concentration in the ternary distillate is of prime importance and may be explained, at least in part, by the fact that within a very narrow boiling range there can be formed two water-bearing constant-boiling mixtures, namely, the ternary mixture of diisopropyl ether, alcohol and water, boiling at 60.5° to 60.9° C., and having a composition, by weight, of diisopropyl ether 89.2%, alcohol 6.4%, and water 4.4%, and the ether-water binary mixture boiling at 61.4° C. This is in sharp contrast to the alcohol-water binary azeotrope boiling at 76° C., or more than 16° C. higher than the boiling points of the water-bearing mixtures formed under the conditions obtained in the practice of this invention. The formation of these mixtures conduces to uniform, highly efficient, and economical still operating conditions, and these mixtures are characterized by the sharp separation into layers of the water-bearing products of distillation.

These layers are found to consist of an upper layer rich in diisopropyl ether comprising 97.5% by volume of the ternary mixture, and consisting of 92.5% by weight of diisopropyl ether, only 6.4% by weight of alcohol, and the remainder water. The lower layer is found to contain 1% by weight of ether, 80% by weight of water, and 19% by weight of alcohol.

The process operates at a maximum degree of rectification when a constant boiling ternary mixture, boiling at between 60.5° and 60.9° C., is distilled. When the operating conditions vary for any reason, other azeotropes may be distilled, namely, the three binary azeotropes possible in a three component system. The most important one of these binary azeotropes, for the purposes of this invention, is that one which consists of diisopropyl ether and water, having a boiling point of 61.4° C. or 1.0° to 0.5° C. higher than the boiling point of the ternary mixture, thus providing an added means for removal of water from the system.

The use of diisopropyl ether in the present process is particularly desirable in that its ternary mixture is very close in boiling point to the ether-water binary constant boiling mixture. Therefore, the water may be separated readily from the alcohol along with the ether, without necessitating the high degree of fractionation so characteristically necessary in other systems for dehydrating ethanol by azeotropic distillation. This feature is illustrated in the present process by the fact that the purification of the alcohol is accomplished with greater efficiency when the water-ether binary is distilled in admixture with the ternary azeotrope. By this means the removal of practically all of the water from the alcohol in a simple, economical and direct distillation step is possible. In fact, alcohol of 99.95% purity can be readily obtained in a single distillation.

The operation of the process is characterized by the fact that there is no need for insuring separation of the ternary azeotrope from the water-ether binary constant boiling mixtures. The mixture of the two azeotropes containing ether and water, obtained as a distillate in this process separates sharply into two layers and the lower layer consisting mainly of water is rapidly removed by decantation. The upper layer can be returned directly to the top of the column, no other reflux being required. The separation of the distillate into layers is not impaired by this method of operation. The heavier layer consisting largely of water can be separately distilled, if desired, to recover the minor amounts of ether and alcohol present. The process can be operated efficiently even when the total distillate contains less water than the amount present in mixtures of only the water bearing azeotropes, which can occur if small amounts of the ether-alcohol binary azeotrope are allowed to pass into the distillate because of poor rectification and also if the process is operated so that an excess amount of ether is distilled over. I have also found that considerably less apparatus and about 60% less steam are required in the present process than in the benzene process.

The process of this invention can be carried out in standard distillation equipment. In the continuous process, in which the use of a decanter is preferred, a charge of diisopropyl ether is placed in the still, and aqueous alcohol is supplied continuously to the column at some point below the still head but above the kettle where there is a sufficient concentration of, diisopropyl ether to carry out the process. From the fifth to the fifteenth tray from the top of a thirty tray column is the preferred location though the exact location will depend on the operating conditions. The upper layer from the decanter is returned to the top of the column.

In operation, the diisopropyl ether distributes itself in the upper part of the still column, and in the decanter, thus facilitating continuous operation. The temperature of the vapors leaving the column (i. e., the still head temperature) is preferably not higher than 61.4° C., at atmospheric pressure, and this temperature is the upper limit of efficient water removal. The temperature can be maintained by the proper control of the amount of diisopropyl ether in the system.

The following example will serve to illustrate the continuous process with reference to the drawing:

Diisopropyl ether, in an amount of about 290 gallons, was charged to a still kettle 1 equipped with a thirty-tray still column 2. Aqueous alcohol, 192 proof, was fed to the fifteenth tray from the top of the column. The distillate was obtained from the condenser 3 at the rate of 600 gallons an hour, and it separated in the decanter 4 into an upper ether layer 5 at the rate of 593 gallons per hour, and a lower water layer 6 at the rate of 7 gallons per hour. The upper layer was returned to the still column, while the lower or water layer was removed. Anhydrous alcohol was removed from the kettle at the rate of 118 gallons per hour. The steam consumed in the steam column 7 was about 1200 pounds per hour.

In the batch process, without a decanter, the control of the still head temperature is maintained by control of the reflux. The still head temperature will rise upon removal of the water, due to the distillation from the system of the aqueous ternary and the ether-water binary constant boiling mixtures. The alcohol and ether in the distillate may be recovered in the manner described above. I have found that the batch process has increased efficiency if a decanter is used, the ether layer being returned to the column as reflux.

Combinations of both the continuous and batch processes may be used. For example, continuous decantation may be combined with either batch or continuous alcohol supply. Any efficient still can be used employing tray-containing or packed columns.

I have found that the system operates efficiently even in the presence of benzene, the benzene being held in the lower part of the column, and not appearing in the distillate.

The presence of small amounts of substances with boiling points higher than alcohol, and miscible with both alcohol and isopropyl ether, such as the monoethyl ether of ethylene glycol, does not detract from the efficiency of the process. Furthermore, the aqueous layer in the distillate is to such a large extent water, that recovery of ether and alcohol from this layer is a relatively minor operation in direct contrast to many distillation processes now in use, particularly the benzene process.

The practice of the present invention is preferably carried out at atmospheric pressure. However, the process is not limited to operation at this pressure, and it may be varied considerably without departing from my invention as defined by the appended claims.

I claim:

1. A process for the removal of water from an aqueous mixture of ethyl alcohol which comprises adding to said mixture diisopropyl ether, and separating by physical means the excess of water and the ether from the ethyl alcohol, whereby ethyl alcohol is recovered in a more concentrated state.

2. In a process for dehydrating ethyl alcohol the step comprising adding diisopropyl ether to the aqueous alcohol, and thereafter distilling the mixture.

3. A process for the removal of water from an aqueous mixture of ethyl alcohol which comprises mixing the liquid aqueous ethyl alcohol with diisopropyl ether, and distilling the resulting mixture to remove the excess of water and the ether from the ethyl alcohol, whereby ethyl alcohol is recovered in a more concentrated state.

4. Process of dehydrating ethyl alcohol which comprises distilling aqueous ethyl alcohol in the presence of diisopropyl ether, removing the water in admixture with diisopropyl ether as a distillate, and recovering substantially anhydrous alcohol as a still bottom.

5. A process for the removal of water from an aqueous mixture of ethyl alcohol which comprises mixing the liquid aqueous ethyl alcohol with diisopropyl ether, distilling the resulting mixture to drive off an azeotrope comprising the ether and water, condensing the vapors of the azeotrope, separating the aqueous phase from the ether phase, and returning the ether phase to the distillation system until the water content of the ethyl alcohol is decreased to the desired extent.

6. A process for the removal of water from an aqueous solution of ethyl alcohol which comprises mixing the aqueous alcohol with diisopropyl ether, subjecting the resulting mixture to distillation to distill over simultaneously substantially all of the water and the ether, and recovering the substantially anhydrous alcohol.

7. Process of dehydrating ethyl alcohol which comprises distilling aqueous ethyl alcohol in the presence of diisopropyl ether, removing the water under conditions such that the distillate contains mixtures of water, ether and alcohol, leaving substantially anhydrous alcohol as a still bottom.

8. Process of dehydrating ethyl alcohol which comprises distilling aqueous ethyl alcohol in the presence of diisopropyl ether, removing the water under conditions such that the distillate contains constant boiling mixtures of water, ether and alcohol, and recovering substantially anhydrous alcohol as a still bottom.

9. Process of dehydrating ethyl alcohol which comprises distilling aqueous ethyl alcohol in the presence of diisopropyl ether, removing the water under conditions such that the distillate contains a ternary mixture of water, ether and alcohol, and the binary mixture consisting of ether and water, substantially anhydrous alcohol being recovered as a still bottom.

10. A process for the removal of water from an aqueous solution of ethyl alcohol which comprises mixing the aqueous alcohol with diisopropyl ether, distilling over and condensing an azeotrope comprising the added ether and water, separating the aqueous phase from the ether phase, returning the ether phase to the distillation system until the condensed distillate no longer stratifies into two phases, and continuing the distillation until substantially all of the ether has been distilled from the system.

11. A process for the removal of water from an aqueous solution of ethyl alcohol which comprises mixing the aqueous ethyl alcohol with diisopropyl ether, and subjecting the resulting mixture to distillation to separate the ether and water from the alcohol, whereby the alcohol is recovered in a substantially anhydrous condition.

12. A process for the removal of water from an aqueous solution of ethyl alcohol which comprises adding to the aqueous solution of the ethyl alcohol diisopropyl ether, and distilling the resulting mixture to separate water therefrom as an azeotrope with the added ether.

13. Process for dehydrating aqueous ethyl alcohol, which comprises introducing said aqueous alcohol to a distilling column containing diisopropyl ether; removing from the column a vaporous mixture consisting of ether, water and alcohol; condensing and separating said mixture into a lower aqueous layer and an uper ether layer; returning the ether layer to the column; and recovering substantially anhydrous alcohol as a still bottom.

14. A continuous process for dehydrating aqueous ethyl alcohol, which comprises introducing said aqueous alcohol at an intermediate point in a distilling column containing diisopropyl ether; removing from the column a vaporous ternary azeotropic mixture consisting of water, ether, and alcohol; condensing and separating said mixture into a lower aqueous layer and an upper ether layer; returning the ether layer to the column; and recovering substantially anhydrous alcohol as a still bottom.

15. A batch process for dehydrating aqueous ethyl alcohol, which comprises distilling said aqueous alcohol in the presence of diisopropyl ether; removing from the distilling apparatus a vaporous ternary azeotropic mixture consisting of ether, water, and alcohol; condensing and separating said mixture into a lower aqueous layer and an upper ether layer; returning the ether layer to the distilling apparatus; and recovering substantially anhydrous alcohol as a still bottom.

16. Process for dehydrating aqueous ethyl alcohol, which comprises introducing said aqueous alcohol at an intermediate point in a distilling column containing diisopropyl ether; removing from the column a vaporous three component mixture consisting of ether, alcohol, and less water than is contained in the ternary azeotropic mixture of these substances; condensing and separating said mixture into an upper ether layer and a lower water layer; returning said ether layer as reflux to the column, substantially no other reflux being employed; and recovering substantially anhydrous alcohol as a still bottom.

17. Process for dehydrating aqueous ethyl alcohol, which comprises distilling said aqueous alcohol in the presence of diisopropyl ether; removing from the distilling apparatus a vaporous three component mixture consisting of ether, alcohol, and less water than is contained in the ternary azeotropic mixture of these substances; condensing and separating said mixture into an upper ether layer and a lower water layer; returning said ether layer as reflux to the column, substantially no other reflux being employed; and recovering substantially anhydrous alcohol as a still bottom.

ALAN MARPLES.